United States Patent
Jaeger et al.

(10) Patent No.: US 7,516,905 B2
(45) Date of Patent: Apr. 14, 2009

(54) POWER CONTROL SYSTEM FOR HEATING DEVICES AND METHOD OF PROVIDING A HEATED MICROENVIRONMENT WITHIN A LARGER ENVIRONMENT

(75) Inventors: Mark H. Jaeger, Mapleton, MN (US); Thomas K. Hiniker, Mankato, MN (US); Michael W. Lundgreen, Fairmount, MN (US)

(73) Assignee: Novonix Corporation, Mankato, MN (US)

( * ) Notice: Subject to any disclaimer, the term of this patent is extended or adjusted under 35 U.S.C. 154(b) by 234 days.

(21) Appl. No.: 11/235,899

(22) Filed: Sep. 27, 2005

(65) Prior Publication Data

US 2006/0016899 A1    Jan. 26, 2006

Related U.S. Application Data

(63) Continuation of application No. 10/426,672, filed on Apr. 30, 2003, now Pat. No. 6,981,649.

(51) Int. Cl.
*A01K 41/00* (2006.01)
*A01K 31/20* (2006.01)

(52) U.S. Cl. .................... 236/3; 236/6; 237/3; 119/306

(58) Field of Classification Search .................... 236/3, 236/6; 237/3; 119/306, 308, 309; 165/211
See application file for complete search history.

(56) References Cited

U.S. PATENT DOCUMENTS

| | | | | |
|---|---|---|---|---|
| 3,761,018 | A | * | 9/1973 | Rekai .......... 236/91 R |
| 4,089,462 | A | * | 5/1978 | Bradford .......... 236/68 B |
| 4,429,829 | A | * | 2/1984 | Dutton .......... 236/78 B |
| 5,189,983 | A | * | 3/1993 | Aitchison .......... 119/437 |
| 5,730,355 | A | | 3/1998 | Lessard et al. |
| 6,177,271 | B1 | | 1/2001 | Butts et al. |
| 6,666,816 | B2 | | 12/2003 | Mountain |
| 2002/0147381 | A1 | | 10/2002 | Kolarovic |

* cited by examiner

*Primary Examiner*—Marc E Norman
(74) *Attorney, Agent, or Firm*—Moore & Hansen, PLLP

(57) ABSTRACT

A power control system for automatically and proportionately metering power to a heating device used to create a warm microenvironment conducive to the health and growth of an animal during a predetermined incubation period is herein disclosed. The power control system transmits proportionally more power to a heating device where an ambient room temperature measured outside of the microenvironment is nearer a predetermined lower limit, and proportionately less power when the ambient room temperature measured outside of the microenvironment is nearer a predetermined upper limit. A method of providing a heated microenvironment within a larger environment also is disclosed.

9 Claims, 10 Drawing Sheets

| TEMP | % POWER | | | | | | | | | | | | | | | | | | | | | | | | |
|---|---|---|---|---|---|---|---|---|---|---|---|---|---|---|---|---|---|---|---|---|---|---|---|---|---|
| 94 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 93 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 92 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 91 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 89 | 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 88 | 10 | 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 87 | 15 | 10 | 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 86 | 20 | 15 | 10 | 5 | 0 | 0 | 0 | 0 | 0 | 0 | 0 | 0 | 0 | 0 | 0 | 0 | 0 | 0 | 0 | 0 | 0 | 0 | 0 | 0 | 0 |
| 85 | 25 | 20 | 15 | 10 | 5 | 0 | 0 | 0 | 0 | 0 | 0 | 0 | 0 | 0 | 0 | 0 | 0 | 0 | 0 | 0 | 0 | 0 | 0 | 0 | 0 |
| 84 | 30 | 25 | 20 | 15 | 10 | 5 | 0 | 0 | 0 | 0 | 0 | 0 | 0 | 0 | 0 | 0 | 0 | 0 | 0 | 0 | 0 | 0 | 0 | 0 | 0 |
| 83 | 35 | 30 | 25 | 20 | 15 | 10 | 5 | 0 | 0 | 0 | 0 | 0 | 0 | 0 | 0 | 0 | 0 | 0 | 0 | 0 | 0 | 0 | 0 | 0 | 0 |
| 82 | 40 | 35 | 30 | 25 | 20 | 15 | 10 | 5 | 0 | 0 | 0 | 0 | 0 | 0 | 0 | 0 | 0 | 0 | 0 | 0 | 0 | 0 | 0 | 0 | 0 |
| 81 | 45 | 40 | 35 | 30 | 25 | 20 | 15 | 10 | 5 | 0 | 0 | 0 | 0 | 0 | 0 | 0 | 0 | 0 | 0 | 0 | 0 | 0 | 0 | 0 | 0 |
| 80 | 50 | 45 | 40 | 35 | 30 | 25 | 20 | 15 | 10 | 5 | 0 | 0 | 0 | 0 | 0 | 0 | 0 | 0 | 0 | 0 | 0 | 0 | 0 | 0 | 0 |
| 79 | 55 | 50 | 45 | 40 | 35 | 30 | 25 | 20 | 15 | 10 | 5 | 0 | 0 | 0 | 0 | 0 | 0 | 0 | 0 | 0 | 0 | 0 | 0 | 0 | 0 |
| 78 | 60 | 55 | 50 | 45 | 40 | 35 | 30 | 25 | 20 | 15 | 10 | 5 | 0 | 0 | 0 | 0 | 0 | 0 | 0 | 0 | 0 | 0 | 0 | 0 | 0 |
| 77 | 65 | 60 | 55 | 50 | 45 | 40 | 35 | 30 | 25 | 20 | 15 | 10 | 5 | 0 | 0 | 0 | 0 | 0 | 0 | 0 | 0 | 0 | 0 | 0 | 0 |
| 76 | 70 | 65 | 60 | 55 | 50 | 45 | 40 | 35 | 30 | 25 | 20 | 15 | 10 | 5 | 0 | 0 | 0 | 0 | 0 | 0 | 0 | 0 | 0 | 0 | 0 |
| 75 | 75 | 70 | 65 | 60 | 55 | 50 | 45 | 40 | 35 | 30 | 25 | 20 | 15 | 10 | 5 | 0 | 0 | 0 | 0 | 0 | 0 | 0 | 0 | 0 | 0 |
| 74 | 80 | 75 | 70 | 65 | 60 | 55 | 50 | 45 | 40 | 35 | 30 | 25 | 20 | 15 | 10 | 5 | 0 | 0 | 0 | 0 | 0 | 0 | 0 | 0 | 0 |
| 73 | 85 | 80 | 75 | 70 | 65 | 60 | 55 | 50 | 45 | 40 | 35 | 30 | 25 | 20 | 15 | 10 | 5 | 0 | 0 | 0 | 0 | 0 | 0 | 0 | 0 |
| 72 | 90 | 85 | 80 | 75 | 70 | 65 | 60 | 55 | 50 | 45 | 40 | 35 | 30 | 25 | 20 | 15 | 10 | 5 | 0 | 0 | 0 | 0 | 0 | 0 | 0 |
| 71 | 95 | 90 | 85 | 80 | 75 | 70 | 65 | 60 | 55 | 50 | 45 | 40 | 35 | 30 | 25 | 20 | 15 | 10 | 5 | 0 | 0 | 0 | 0 | 0 | 0 |
| 70 | 100 | 95 | 90 | 85 | 80 | 75 | 70 | 65 | 60 | 55 | 50 | 45 | 40 | 35 | 30 | 25 | 20 | 15 | 10 | 5 | 0 | 0 | 0 | 0 | 0 |
| 69 | 100 | 100 | 95 | 90 | 85 | 80 | 75 | 70 | 65 | 60 | 55 | 50 | 45 | 40 | 35 | 30 | 25 | 20 | 15 | 10 | 5 | 0 | 0 | 0 | 0 |
| 68 | 100 | 100 | 100 | 95 | 90 | 85 | 80 | 75 | 70 | 65 | 60 | 55 | 50 | 45 | 40 | 35 | 30 | 25 | 20 | 15 | 10 | 5 | 0 | 0 | 0 |
| 67 | 100 | 100 | 100 | 100 | 95 | 90 | 85 | 80 | 75 | 70 | 65 | 60 | 55 | 50 | 45 | 40 | 35 | 30 | 25 | 20 | 15 | 10 | 5 | 0 | 0 |
| 66 | 100 | 100 | 100 | 100 | 100 | 95 | 90 | 85 | 80 | 75 | 70 | 65 | 60 | 55 | 50 | 45 | 40 | 35 | 30 | 25 | 20 | 15 | 10 | 5 | 0 |
| 65 | 100 | 100 | 100 | 100 | 100 | 100 | 95 | 90 | 85 | 80 | 75 | 70 | 65 | 60 | 55 | 50 | 45 | 40 | 35 | 30 | 25 | 20 | 15 | 10 | 5 |
| 64 | 100 | 100 | 100 | 100 | 100 | 100 | 100 | 95 | 90 | 85 | 80 | 75 | 70 | 65 | 60 | 55 | 50 | 45 | 40 | 35 | 30 | 25 | 20 | 15 | 10 |
| 63 | 100 | 100 | 100 | 100 | 100 | 100 | 100 | 100 | 95 | 90 | 85 | 80 | 75 | 70 | 65 | 60 | 55 | 50 | 45 | 40 | 35 | 30 | 25 | 20 | 15 |
| 62 | 100 | 100 | 100 | 100 | 100 | 100 | 100 | 100 | 100 | 95 | 90 | 85 | 80 | 75 | 70 | 65 | 60 | 55 | 50 | 45 | 40 | 35 | 30 | 25 | 20 |
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

DAY

FIG. 1

POWER CONTROL SYSTEM FOR HEATING DEVICES AND METHOD OF PROVIDING A HEATED MICROENVIRONMENT WITHIN A LARGER ENVIRONMENT

RELATED APPLICATIONS

This application is a Continuation Application of U.S. application Ser. No. 10/426,672, filed 30 Apr. 2003, entitled "Electronic Control for Heating Apparatus", which claims the benefit of U.S. Provisional Application No. 60/376,981 filed 30 Apr. 2002, entitled "Electronic Control for Heating Apparatus."

FIELD OF THE INVENTION

This invention relates to an electronic control device for automatically adjusting the power supplied to one or more heating devices so as to maintain a heated microenvironment within the larger environment of an animal confinement building.

BACKGROUND OF THE INVENTION

Infrared heat lamps and/or electric heat mats are often used by swine producers to provide supplemental heat to young and newly born piglets. Supplemental heat is required for young piglets because they lack the necessary thermal insulation and the ability to manage their body temperature. Without supplemental heat, the piglets would obtain the necessary warmth from the sow. However, because sows can often trample or lay upon piglets, it is desirable to provide the supplemental needed to warm the piglets using artificial heating devices.

The supplementary heat is localized to a small area, thereby creating for the piglets a comfortable microenvironment within a larger farrowing room. Providing localized heat is preferred over large area heating because of the reduction in energy consumption, improved air quality, and ability to maintain a cooler room temperature, which is more appropriate for the lactating sows.

As newborn piglets grow their need for supplemental heat is reduced, allowing for the gradual reduction of supplemental heat during the first 2-3 weeks following birth. Various manual and semiautomatic methods have been devised for reducing this heat, including: raising up the heat lamps by means of a chain, a rheostat control for manual power adjustment, on/off thermostats, timers, high/low power switches, unplugging the heat lamp and using circuit breakers or toggle switches for manual on/off control. There are also a number of electronic controls having variable output power capability that can, to a limited degree, and at considerable expense, provide a means to automatically adjust the heat output to match the needs of the piglet.

Thermostats, timers and various other types of on/off switching devices lack the ability to modulate the power to the heating device, often resulting in a too hot or too cold condition that causes discomfort to the piglet, affecting the health of the animal, and it's ability to efficiently convert feed to weight gain.

Rheostats and similar manually adjusted devices lack the ability to dynamically adjust the heater's output in response to changing room temperatures and the reduced heat requirement of a growing piglet. Again, this often results in a too little or too much heat being applied to the microenvironment as the room temperature fluctuates due to seasonal and weather conditions beyond the producer's control. For example, a hot summer day can result in a gradual heating of the room to the extent that supplemental heat is not required for the young piglets. But as the nighttime air cools the room, the need for supplemental heat is again required. Attempting to manually adjust the supplemental heat to match the changing conditions becomes a 24-hour a day management problem.

Some of the current generation of sophisticated electronic controls, do have the capability of adjusting the output of heating devices based on temperature and animal age. These controls measure the temperature within the microenvironment near the heating device and regulate the output thereof based on a desired microenvironment temperature, using a closed loop control algorithm. However, from a practical standpoint, these controls are not able to reliably control the large number of heating devices found in a typical animal confinement building. These controls have failed to achieve widespread appeal and success due in part to their high purchase and installation costs. In addition, the skill required to properly setup, operate, maintain, and troubleshoot these complex controls is also a major factor. Other, simpler and less expensive controls have sprung up to compete with their relatively more complex brethren, but are also limited by their limited capability and high installation costs.

The present invention is therefore directed to the following objectives: to provide energy savings through automatic reduction of the heating power applied to heating devices as piglets age; to provide energy savings through the automatic reduction of heating power applied to heating devices as the temperature of the farrowing room where the piglets are kept rises; to obviate the need to manually adjust lamp heights or to manually reduce power; to create an improved heated microenvironment for the piglets to result in healthier and more productive piglets; to reduce potential for heat stress to the sows by minimizing the heat added to the larger environment of the farrowing room; to extend the useful life of the heating devices used by providing a soft start feature; to eliminate lamp inrush current so that lamps run cooler at reduced power levels; to reduce peak demand from backup generators or power utilities; and, to reduce piglet mortality due to crushing by maintaining a comfortable microenvironment that allows young piglets to keep away from the sow. In addition to its use in farrowing operations, it is to be understood that the present invention is susceptible of use in agricultural, zoological and home settings with myriad animals, including but not limited to, birds such as chickens and turkeys, dogs, and cats.

These and other objectives and advantages of the invention will appear more fully from the following description, made in conjunction with the accompanying drawings wherein like reference characters refer to the same or similar parts throughout the several views.

BRIEF SUMMARY OF THE INVENTION

The objects of the present invention are realized in a method of controlling the heat applied to a microenvironment in such a manner as to promote the health, well-being, and growth of a young animal present within the microenvironment. This method begins with the step of providing a heating device that is constructed and arranged to create the heated microenvironment within a larger environment. Next, a low temperature limit at and below which the heating device will operate at substantially 100% of its rated power is chosen, as is a high temperature limit at which the heating device will be caused to operate at substantially 0% of its rated power. The temperature of the larger environment outside of the microenvironment is then measured and power is applied the heating device based on this measurement. Where the temperature of the larger environment is below the high temperature limit, the heating device will be activated to create the heated microenvironment. The power that is applied to the heating device is varied with the temperature of the larger environment so as to maintain a continuous heat output from the heating device. The power applied to the heating device ranges from 0%-100% of the rated power for the heating device and is applied over that range of temperatures defined by the upper and lower temperature limits. The power applied to the heating device is set to 100% of rated power when the temperature of the larger environment is at or below the lower temperature limit and is set to 0% when the temperature of the larger environment is above the upper temperature limit.

Power may be applied to the heating device in a linear or non-linear manner and may be varied discontinuously or continuously. In a preferred embodiment of the present invention, power is applied to the heating device so as to obtain a linear output from the heating device.

A preferred embodiment of a control mechanism for controlling the power applied to a heating device comprises a data processor that is operatively coupled to a memory device, to an operator control input/output device, and to a temperature sensor for sensing a temperature of larger environment inside which is created the heated microenvironment. The temperature sensor provides control data to the microprocessor. The control mechanism is also provided with a variable power switch that is coupled between a power input and a power output. The variable power switch communicates with and is controlled by the data processor according to the temperature sensed by the temperature sensor. The power output of the control mechanism is in turn coupled to a heating device whose output creates the heated microenvironment within the larger environment. The variable power switch preferably comprises a switching mechanism that can be one of a rheostat, a triac, or one or more thyristors.

The power control mechanism preferably also comprises a fault checking circuit for determining whether a fault condition is present. This fault checking is coupled to the microprocessor, which is programmed to open the variable power switch if a fault condition is sensed. The fault checking circuit preferably shares an induction coil with a low pass filter. The low pass filter acts to prevent electromagnetic noise that can disrupt electronic equipment in the area adjacent the power control mechanism.

A power control algorithm, embodied in the appropriate computer coding, is recorded on the memory device. The power control algorithm defines a high temperature limit above which power to the heating device is cut off and a low temperature limit at and below which power applied to the heating device is set to 100% of the rated power of the heating device. The power control algorithm varies the power applied to the heating device based on the output of the temperature sensor so as to vary the heat output of the heating device, preferably in a continuous manner.

The power control algorithm controls the variable power switch through the data processor. Power is provided at levels between 0-100% of the rated power of the heating device for temperatures in the larger environment defined by the high and low temperature limits. The power control algorithm is constructed and arranged to supply power through the variable power switch such that a heat output of the heating device is linear over an operational range that is defined by high and low temperature limits.

In one embodiment of the present invention, all of the components of the power control mechanism are located together within a single, sealed enclosure. However, in some applications, the present invention may distribute the components of the power control to remote locations. In one such embodiment, the data processor, the memory device, the operator control input/output device, and the temperature sensor are positioned outside of the microenvironment and remotely from the variable power switch. In a distributed embodiment of the power control mechanism, the data processor may be coupled to a plurality of variable power switches, each of the plurality of variable power switches being constructed and arranged to control power output to a heating device positioned within a single microenvironment or to multiple heating devices in one or more microenvironments.

The present invention may also be described as a power control for metering the power transmitted to a heating device having a rated power capacity that is constructed and arranged to create a warm microenvironment conducive to the health and growth of an animal. The percentage of the rated power capacity applied to the heating device by the power control is related to an ambient room temperature and the age of the animal.

The power control device sets a high and a low limit that are related to an ambient temperature outside of the microenvironment. The power control transmits proportionately more power to the heating device where the ambient temperature is nearer the lower limit and proportionately less power where the ambient temperature is nearer the high limit. These high and low temperature limits may be modified to adjust the output of the heating devices. For example, the power control may periodically lower the high and/or low temperature limits over a predetermined elapsed time period. One example of the present invention lowers the high temperature limit one degree per day for 25 days.

Although the disclosure hereof is detailed and exact to enable those skilled in the art to practice the invention, the physical embodiments herein disclosed merely exemplify the invention, which may be embodied in other specific structure. While the preferred embodiments have been described, the details may be changed without departing from the invention, which is defined by the claims.

BRIEF DESCRIPTION OF THE DRAWINGS

FIG. 1 is a table setting forth the algorithm whereby power settings are modified to maintain a suitable microenvironment while simultaneously reducing power consumption;

DETAILED DESCRIPTION OF THE INVENTION

Figure 2A:
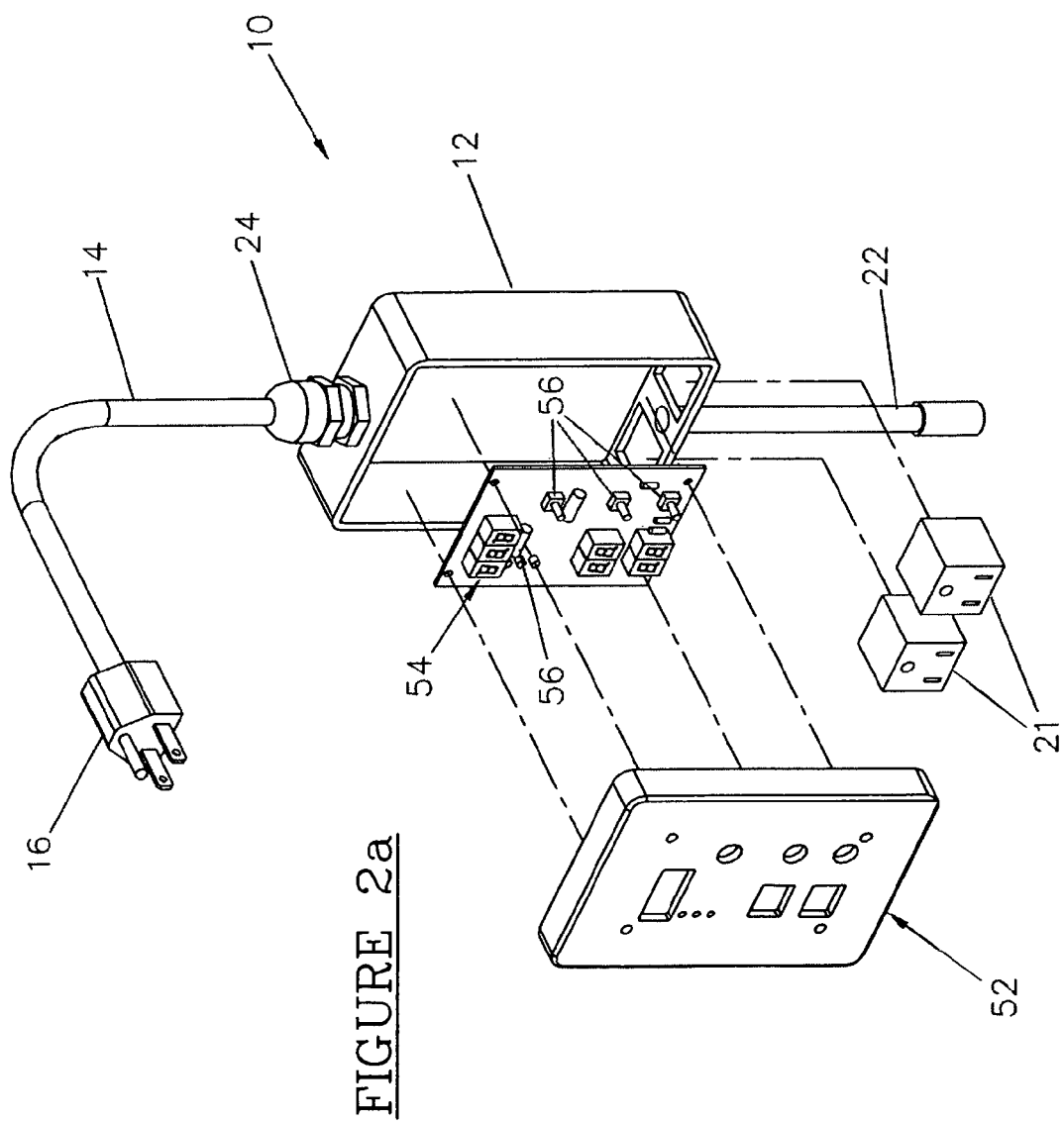
FIG. 2a is a perspective view of the present invention illustrating a portable embodiment of the present invention having built in power receptacles.
Figure 2B:
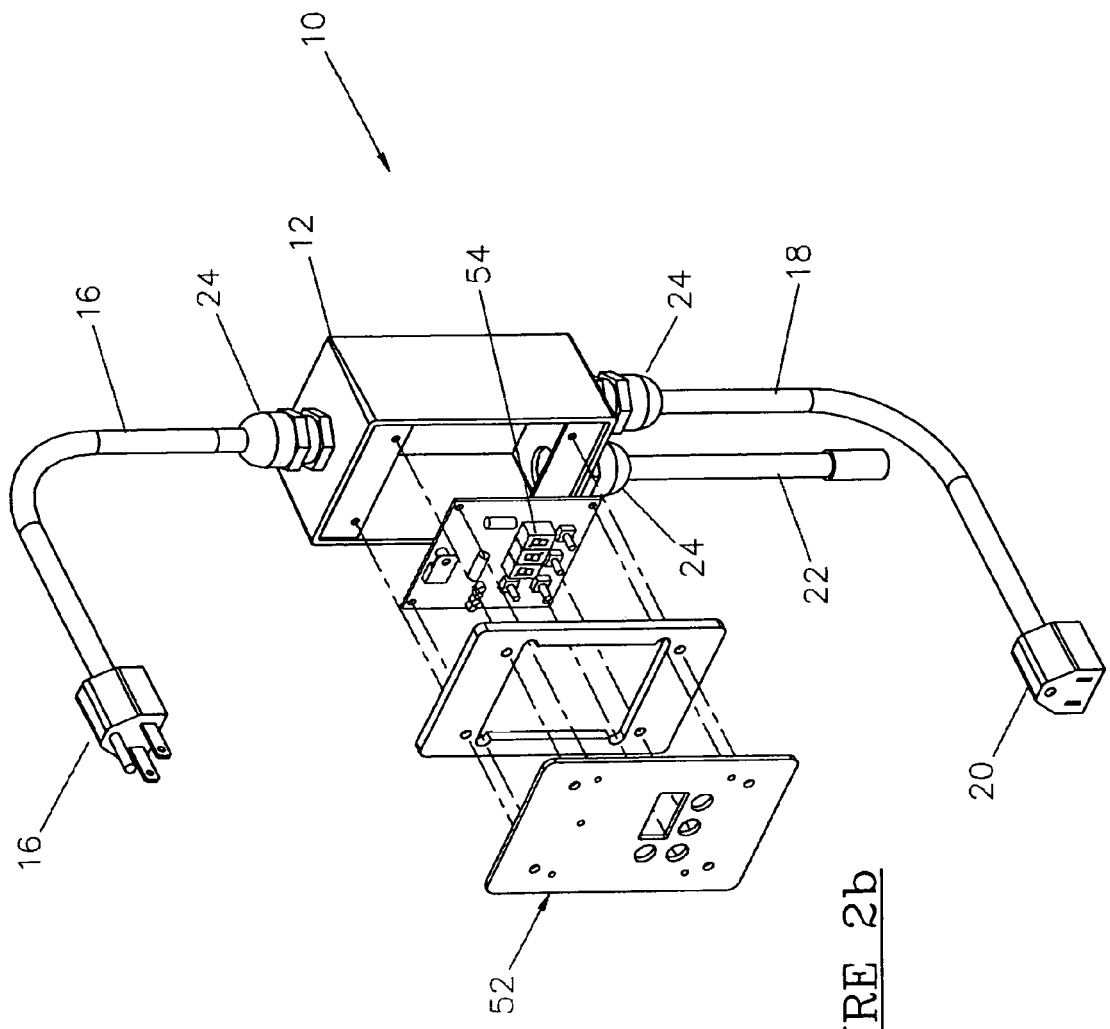
FIG. 2b is a perspective view of the present invention illustrating a portable embodiment of the present invention having an output power cord with a receptacle at the end thereof.
Figure 4:
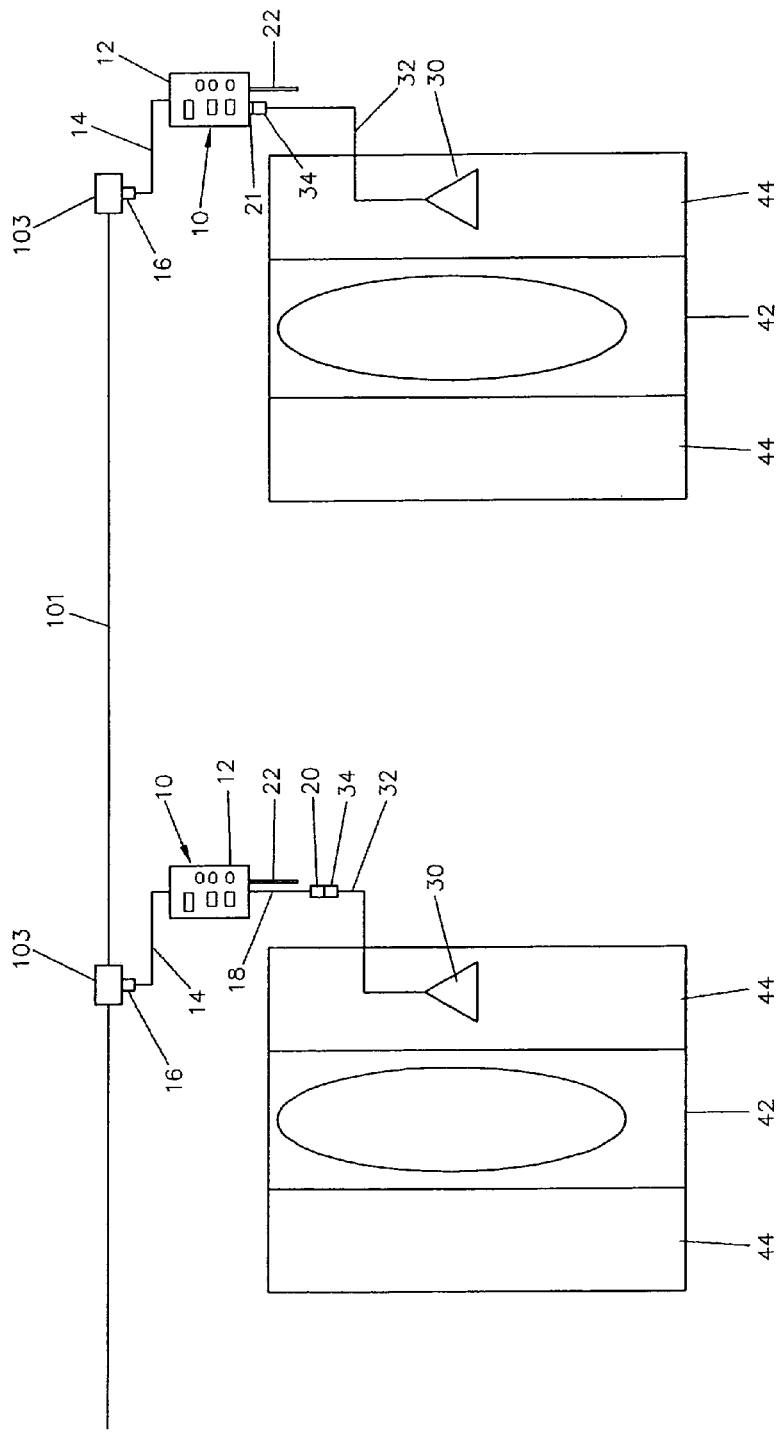
FIG. 4 is a schematic view of the power control illustrated in FIGS. 2a and 2b in use in a farrowing operation.
Figure 6:
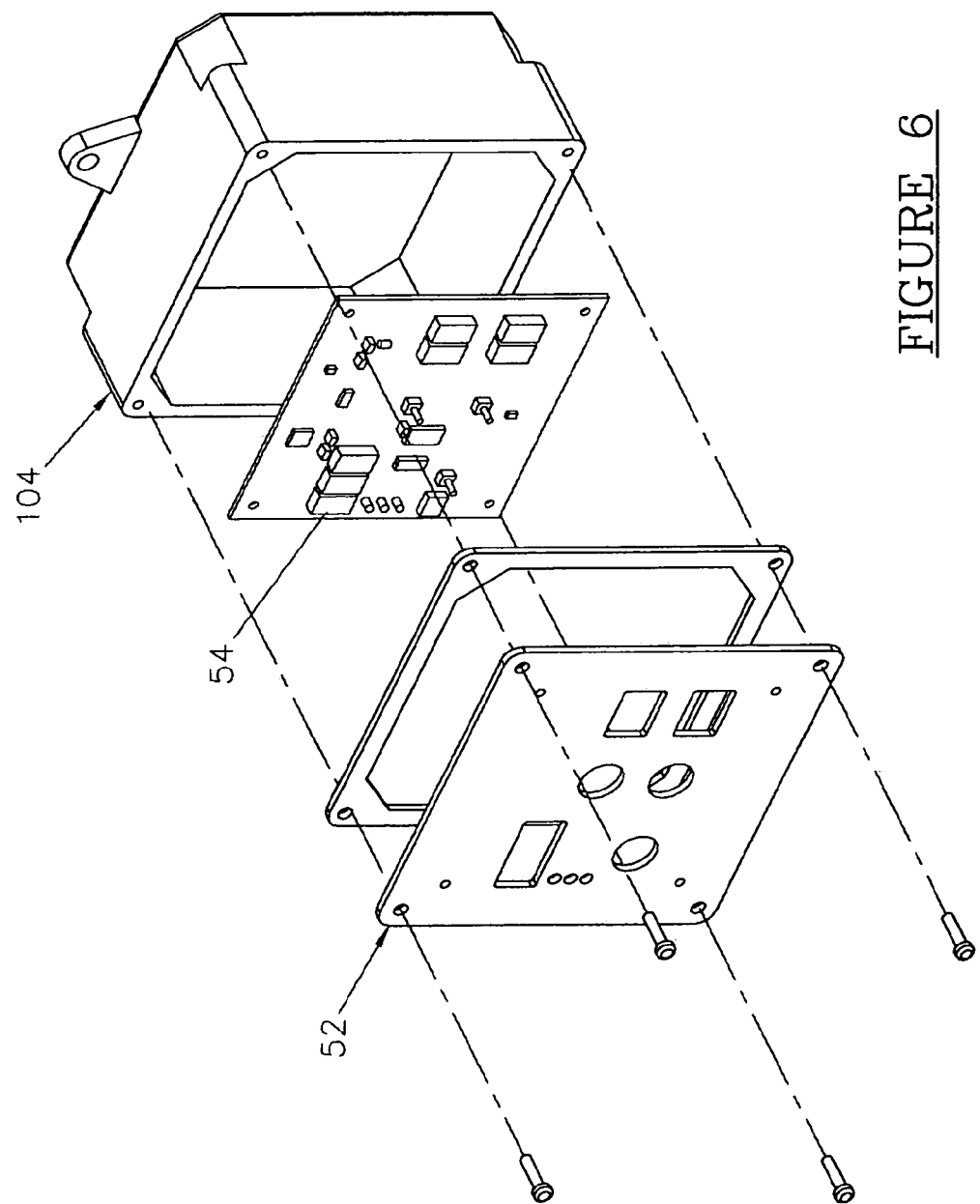
FIG. 6 is an exploded perspective view of a master control of the power control illustrated in FIG. 5.
Figure 7:
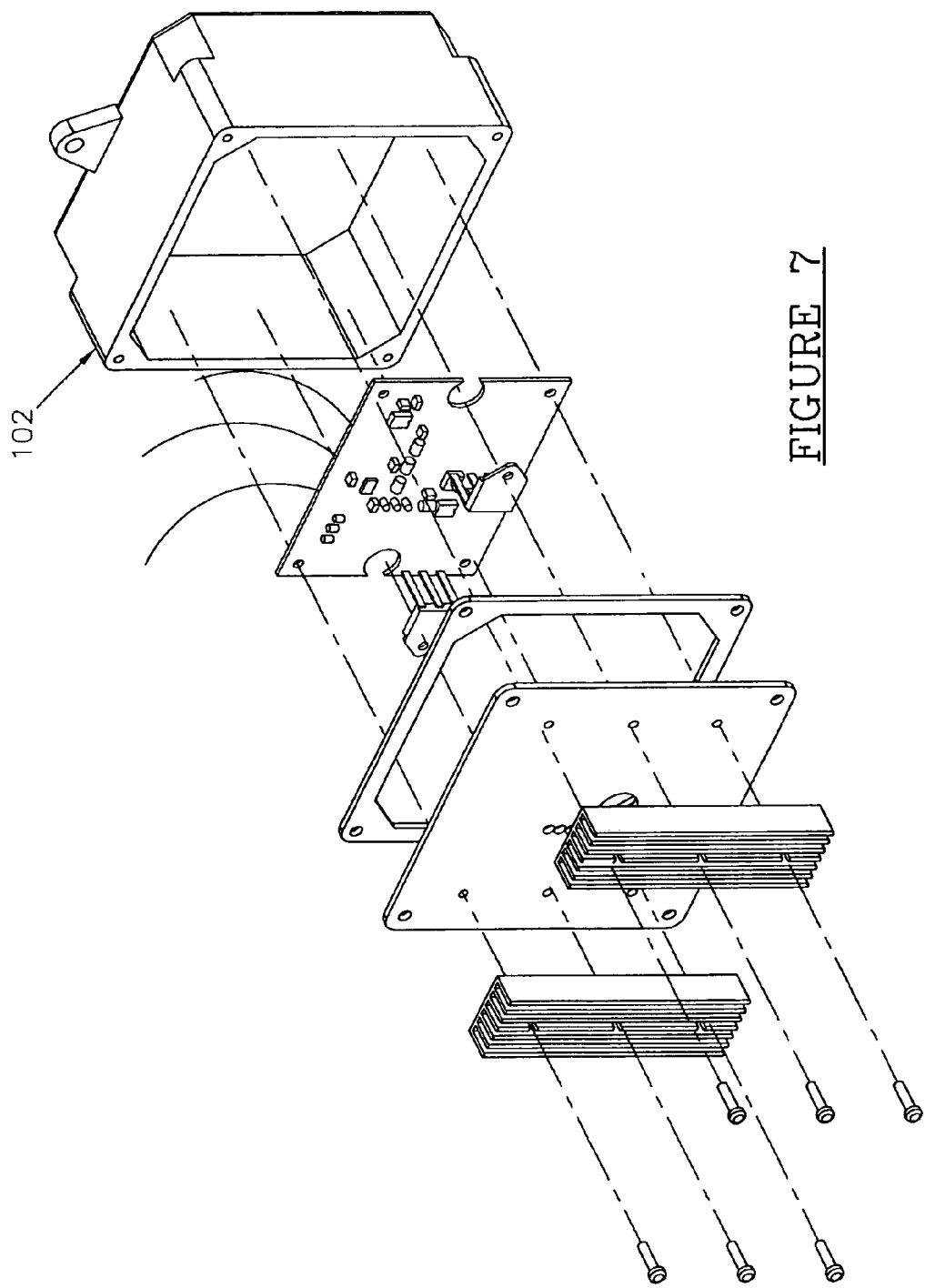
FIG. 7 is an exploded perspective view of a slave switch of the power control illustrated in FIG. 5.

The power control of the present invention may be embodied in a stand-alone device such as that pictured in FIGS. 2a and 2b or in a hard-wired version such as that pictured in FIGS. 6-7. Referring first to FIGS. 2a, 2b, and 4, a portable embodiment of the power control 10 can be seen to comprise a small watertight enclosure 12 with an input power cord 14 having a suitable and standard male or female coupling 16, and an external temperature sensor 22. The portable embodiment of the power control 10 may further comprise one or more built in receptacles 21 that are built into the housing 12 (see FIG. 2a) or an output power cord 18 with one or more standard receptacles 20 (see FIG. 2b). The input power cord 14, output power cord 18 (where present), and the temperature sensor 22 preferably enter the enclosure through liquid tight strain relief connectors 24, though it is to be understood that any suitable connection mechanism may be utilized.

Referring next to FIG. 4, the power control 10 may be used advantageously in a farrowing operation to promote the health and efficient growth of piglets. Note that though the power control 10 as described herein is used in a farrowing operation, the power control 10 may be reconfigured without exceeding the broad scope of the present invention to be used in aviaries, zoos, or in the home for the care of household pets. The power controls 10 of the present invention are situated within a farrowing room 40. Within the farrowing room 40 there are placed one or more farrowing crates 42 in which are confined the sows (not shown). The farrowing crates 42 are provided with mechanisms for cleaning and feeding the sow and typically have sides that allow the piglets (not shown) to move freely from the farrowing crate 42 to a heated microenvironment 44. Note that the microenvironment 44 is immediately adjacent to the farrowing crate 42 and is accessible to the piglets. Note also that the farrowing crate 42 and the microenvironment are fenced to prevent the piglets from escaping to the larger environment of the farrowing room 40 in general.

While FIG. 4 illustrates only two farrowing crates 42, microenvironments 44, and associated power controls 10, it is to be understood that a farrowing room 40 may contain any number of farrowing crates 42. In addition, while FIG. 4 illustrates only a single heating device 30 in use with each of the respective power controls 10, it is to be understood that a single power control 10 may be used to control multiple heating devices 30.

Figure 5:
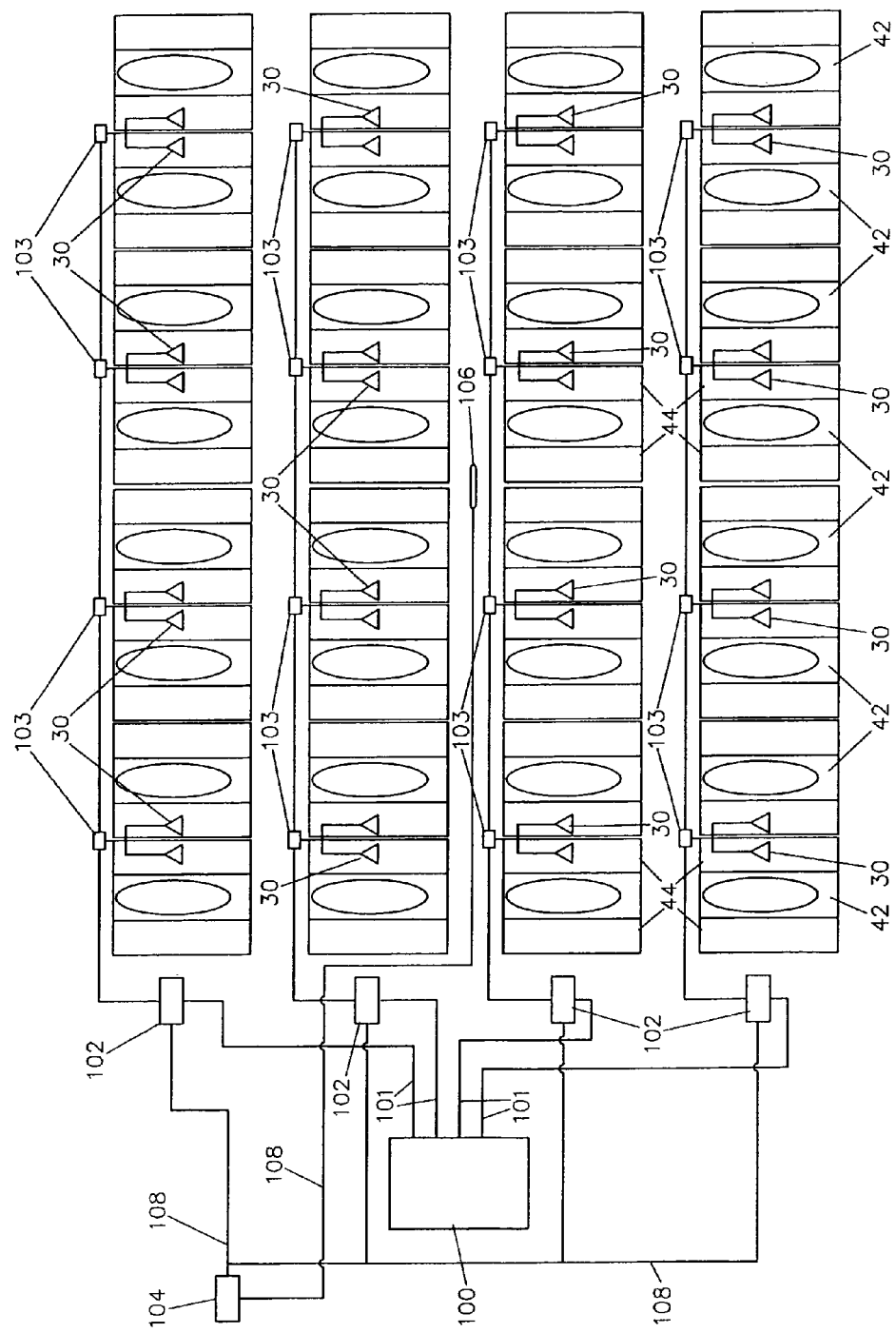
FIG. 5 is a schematic view of a distributed power control of the present invention.

Heating devices 30 are arranged with respect to the microenvironments 44 so as to provide heat thereto. While the heating devices pictured in FIGS. 4 and 5 are schematic illustrations of infrared lamps of one type or another, it is to be understood that the power controls 10 of the present invention may be readily adapted for use with virtually any electrically powered heating device, including but not limited to, heat lamps and heating pads. In addition, with the provision of a suitable control valve (not shown), the power controls 10 could be adapted to operate gas or oil fired heating devices (not shown).

A heating device 30 is installed in its predetermined position in or adjacent the microenvironment 44 such that heat energy 36 is directed into the microenvironment 44. Where the heating device 30 is a lamp, heat energy 36 will be radiated into the microenvironment 44 via infrared radiation. Where the heating device 30 is a heat mat, the heat energy 36 is generally transmitted into the microenvironment 44 by thermal conduction. Installation of the embodiments of the power control 10 shown in FIGS. 2-4 comprises plugging a heating device 30 into the power control 10 output receptacle 20 or 21 as the case may be. The power control 10 power cord 14 is then connected using plug 16 to a standard electrical outlet (not shown). While the enclosure 12 of the power control 10 may simply rest on the floor of the farrowing room 40, it is preferred to hang or mount the enclosure 12 off the floor to avoid damage thereto. The power control 10 may be provided with elongate power cords 14, 18 of a length that would allow for the mounting of the enclosure 12 in a desired location. As the power control 10 operates on an open loop basis, the temperature sensor 22 must be mounted outside of the microenvironment 44 and otherwise away from the heating devices 30. The temperature sensed by the sensor 22 will accordingly be the temperature of the larger environment of the farrowing room 40 rather than that of the microenvironment(s) 44. In general, as the temperature of the farrowing room 40 goes up, the power applied to the heating devices 30 is reduced and vice versa.

The power control 10 modifies the output of the heating devices 30 by modulating the input power (voltage) to the heating devices 30 over an adjustable range of between 0% and 100%. The power input range is determined by the rated power output of the power control 10. Where the power control 10 is rated at a maximum output of 120 volts, the adjustable range of power input to the heating device will vary between 0 volts (0%) to 120 volts (100%). Similarly, where the power control 10 is rated for a maximum output of 240 volts, the adjustable range of power input to the heating device will vary between 0 volts (0%) to 240 volts (100%). Note that the power control may be adapted to control any suitable power range. The range typically being determined by the nature of the heating devices 30 themselves as heating devices 30 rated at 120 volts will require a power control rated at 120 volts and heating devices rated at 240 volts will require a power control rated at 240 volts. The power input to the heating devices 30 is managed by correlating the measured room temperature outside of the microenvironment 44 and the time elapsed since the heating device 30 was activated to create the heated microenvironment 44.

The power control band is based on a LOW temperature setting corresponding to the desired temperature for minimum heat output (0% power) and a HIGH temperature setting corresponding to the desired temperature for maximum heat output (100% power). When the measured room temperature is between the HIGH and LOW settings, the power output to the heating devices 30 will be modulated to proportionate with respect to the temperature and where it falls on the control band.

In one preferred embodiment, the power output to the heating devices 30 by the power control 10 may be modulated as shown in FIG. 1. In this embodiment the control band is set to a HIGH limit of 90° F. and a LOW limit of 70° F. such that where the temperature of the farrowing room 40 as determined by temperature sensor 22 is 90° F., the power output to the heating device 30 will be set at 0%. Similarly, where the temperature of the farrowing room 40 as determined by temperature sensor 22 is 70° F., the power output to the heating device 30 will be set at 100%. In general, where the temperature of the farrowing room 40 is below the LOW temperature limit, the power output to the heating devices 30 will be set to 100% and will remain there until such time as the room temperature increases to above the LOW temperature limit. This is to provide heat to the microenvironment 44 on cold days where the temperature of the farrowing room 40 never reaches the LOW temperature limit.

In the control algorithm embodied in the chart of FIG. 1, the power setting of the power control 10 varies linearly over the control band defined by the LOW and HIGH temperature limits by 5% for each degree of change in the room temperature. For a control device rated at 120 volts, for each degree change, the power output of the power control 10 will vary by 6 volts. Accordingly, on day 1 of operation and where the temperature of the farrowing room 40 is 85° F., the power output setting of the power control 10 will be 25% of rated power.

As the requirements of the piglets for supplementary heat during their first weeks of life gradually diminish, the power output settings of the power control 10 will be revised downward. In the embodiment shown in FIG. 1, the microenvironment 44 is heated for the first 25 days of the piglets' lives, with the output of the power control 10 being lowered each day. Note that this period may be varied from zero on up according to the needs of the particular application to which the power control 10 is adapted. Note also that the time period over which the power control 10 is used may be measured in any useful time measure, from seconds to years. The drop in the output of the power control 10 over a period of time is in the embodiment of FIG. 1 determined by dropping the LOW and HIGH temperature limits by one degree Fahrenheit each day over the selected 25-day period. This has the practical effect of lower the range of power outputs available to the power control 10 by 5% per day over the given period.

It is to be understood however, that the power output of the power control 10 may be modulated in a non-linear and/or discontinuous fashion over a given control band and over a selected period of time. Because the output of many heating devices 30 is not linear and may even be discontinuous with respect to the voltage applied thereto, modulating the power output of the power control 10 in a linear fashion will result in non-linear or discontinuous output from the heating device 30. As it is desirable to provide at least a continuous heat output from the heating devices 30, the control algorithm whereby the power control 10 modulates the power output therefrom may be adapted to provide electrical power to the heating devices in a non-linear and/or discontinuous manner.

Figure 8:
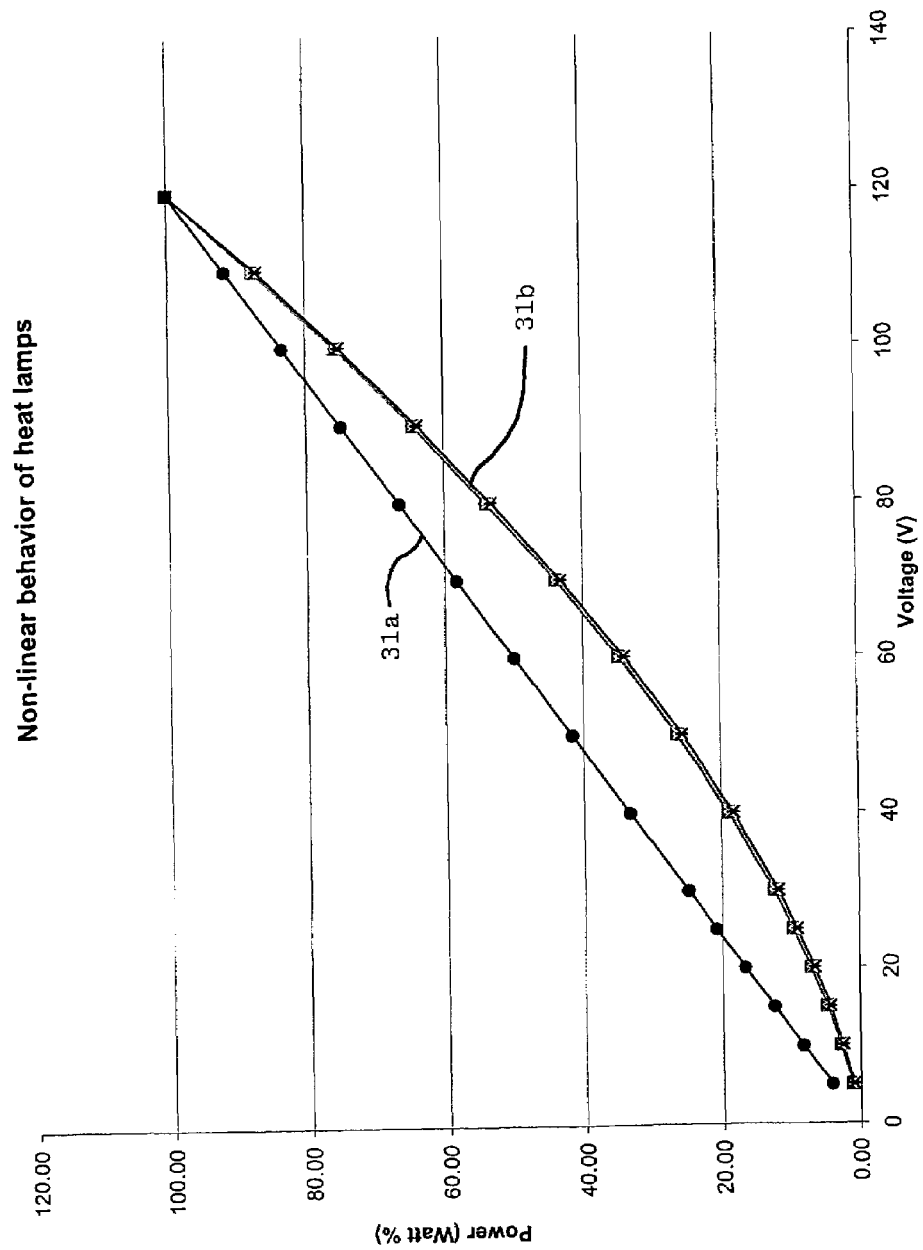
FIG. 8 is a graph of typical power output in (% of rated power) of a heating element for a given power input (in volts); and, FIG. 9 is a schematic illustration of a distributed power control system of the present invention.

As can be seen in FIG. 8, heating devices 30 such as a heat lamp will, for a given applied voltage, yield a power output that is non-linear with respect to the power (voltage) input to the heating device 30. Note that the output of a typical heating device 30 is shown in the Figure as line 31b. Accordingly, where it is desirable to ensure that the output of the heating devices 30 be linear as shown by line 31a which represents an ideal linear power output, the voltage applied to the heating devices 30 by the power control 10 will be varied non-linearly over the control band in order to drive a linear output for the heating devices 30. It is to be understood that the function used to calculate the percent power output of the power control 10 would be specific to each heating device 30. Resistive heating devices 30 such as heat pads are more generally linear in their response and accordingly the function used to calculate the power to be applied to a heat pad would be linear in nature. As heat lamps vary in their output as shown in FIG. 8, the function used to determine the output of the power control 10 would more closely approximate a homolog of the curve shown in the Figure. Again, it is desirable to provide a continuous heat output from the heating devices 30 in order to increase the comfort and productivity of the piglets. Accordingly, it is preferred to utilize an algorithm for determining the power output of the power control 10 that results in a continuous power output from the heating devices 30. The preferred continuity would apply to both the output of the heating devices 30 over the control band temperatures and over time.

Note that both the control band HIGH/LOW temperature limits and the period over which the HIGH/LOW temperature limits are reduced may be preset for a particular operation, in the present case a farrowing operation, or may be modified directly by the user of the power control. In either case, the user may override the preset control band and the time period over which the power control is used, or the rate at which the control band is modified by direct input of information into the power control 10.

Figure 3:
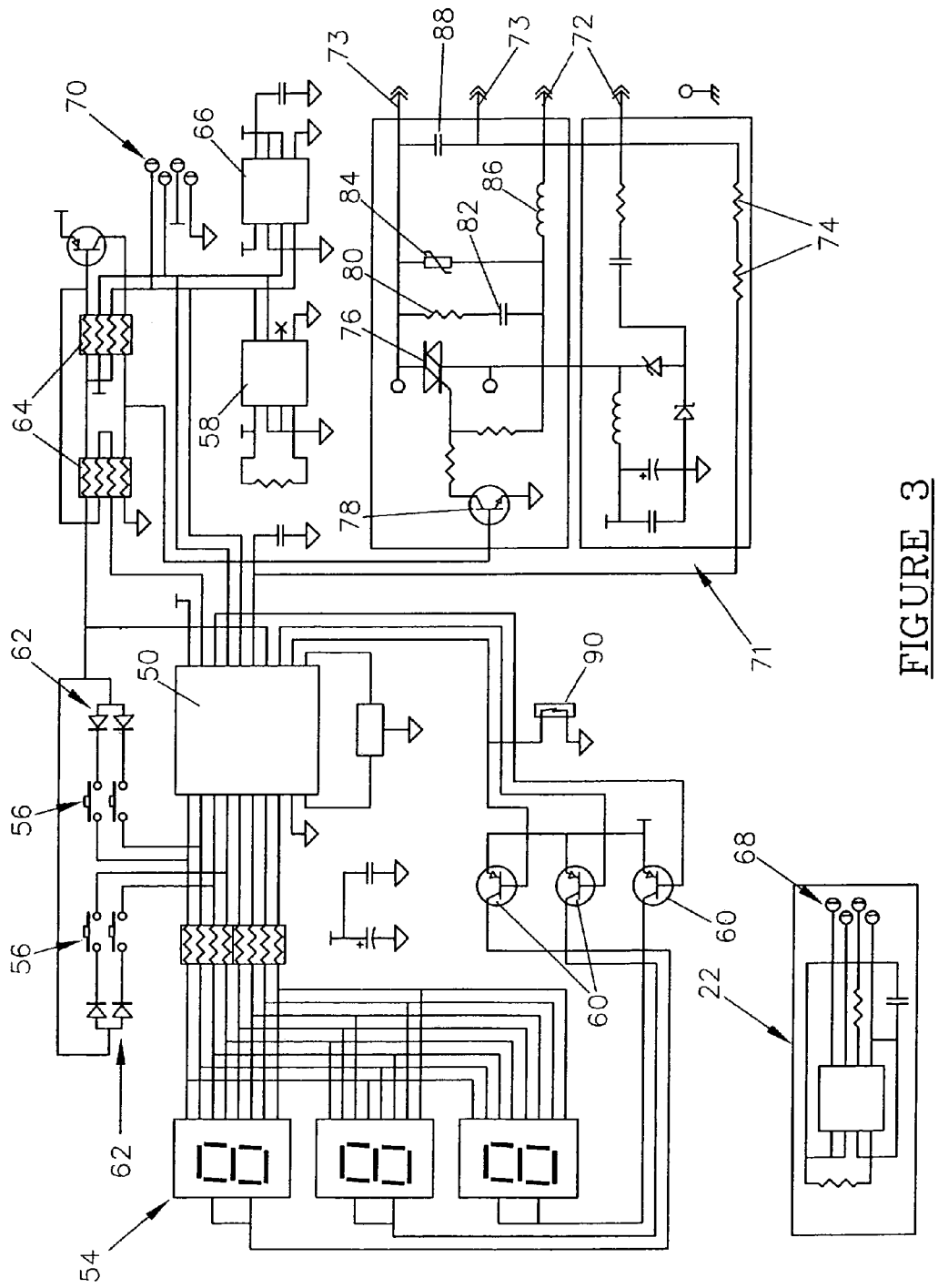
FIG. 3 is a schematic of one embodiment of a circuit that enables the present invention.

FIG. 3 represents one embodiment of the circuitry of a power control 10 of the present invention. The power control 10 comprises a microprocessor 50. One suitable microprocessor 50 includes integrated memory but may instead be coupled to a suitable RAM and/or ROM memory device. The microprocessor 50 is programmed with an object code that manages the overall operation of the power control 10, as described above.

The power control 10 implements a unique open loop process for proportionally controlling the power (voltage) applied to a plurality of heating devices 30 based on the temperature of a larger environment and elapsed time or animal age for the purpose of achieving an optimized thermal microenvironment. The power control is capable of operating in Celsius or Fahrenheit modes using a 50/60-Hertz power source.

A user interface 52 is built into the enclosure 12 and preferably consists of a 3-digit numeric display 54 and a number of pushbutton switches 56, preferably four, along with the related microprocessor interface components including display driver transistors 60, diodes 62, resistor arrays 64 and the necessary electrical connectors that are constructed and arranged as shown in FIG. 3. Note that the user interface 52 may comprise any useful combination of input mechanisms and display devices known to those skilled in the art. The user interface 52 may be used to start the operation of the power control 10, set the appropriate time period over which the control band temperatures will be modified, to input the control band temperatures or virtually any other datum needed to implement the algorithm set forth hereinabove. In some embodiments, the user interface 52 may be used to "lock" the power control 10 in order to prevent accidental data entry, i.e. to prevent accidental entry of erroneous commands or data.

An internal temperature sensor 58 measures the temperature within the enclosure 12 and communicates its readings to the microprocessor 50. The object code with which the microprocessor 50 is programmed includes instructions that will temporarily shutdown the power control 10 if the internal temperature rises above approximately 150° F.-160° F. Note that the shutdown temperature is variable depending on the nature of the components that make up the circuitry and the setting in which the power control 10 is used.

The external temperature sensor 22 is electrically connected to the microprocessor 50 through respective male and female coupling halves 68 and 70, though the sensor 22 may be permanently connected as by soldering. As indicated above, these coupling halves 68, 70 preferably make up a liquid tight strain connectors 24. The sensor 22 measures the room temperature and communicates its readings to the microprocessor 50. A nonvolatile memory chip 66 is electrically coupled to the microprocessor 50 and is used to store various parameters and operating information such as the temperature readings from the sensor 22. The nonvolatile memory chip 66 also retains all power control operational settings in the event of a power failure.

The power supply 71 translates the nominal 120 VAC (or with ready modification 240 VAC) received through power cord 14 conductors 72 to approximately 4.5 VDC for proper operation of the aforementioned low voltage circuitry. Resistors 74 couple the line voltage frequency into the microprocessor 50 to provide a suitable synchronization signal, in this case at 50/60 Hertz. Microprocessor 50 controls the power supply 71 so as to apply power to the heating devices 30 in a gradual manner generally known as a "soft start". The soft start application of voltage to the heating devices 30 prevents voltage surges from damaging the heating devices 30 by limiting the power applied to, for example, a heat lamp. Because heat lamps have a low resistance when they are cold and are first powered up, the application of full power to a cold lamp will result in momentary high inrush currents that can damage the lamp.

A solid-state power switch known as a triac 76 directly controls the voltage applied to the heating devices 30 through conductors 73 and is itself controlled by signals received from transistor 78. Resistor 80 and capacitor 82 form a snubber circuit, along with a varistor 84, protect the triac 76 from voltage surges. Filter coil 86 and capacitor 88 form a low pass filter for minimizing generated electromagnetic noise.

Filter coil 86 in this embodiment, doubles as part of a fault detection circuit that also includes switch 90. Switch 90 is a magnetic switch that is magnetically coupled to filter coil 86 such that the switch 90 closes when a magnetic field produced by current flowing through the filter coil 86 reaches a predetermined strength that is associated with a short circuit condition. The microprocessor 50 periodically checks the open/close status of switch 90 to determine if a short circuit condition has been detected. Upon detecting a closed switch condition, the microprocessor 50 cuts power to the heating devices 30 for approximately 5 seconds and then slowly reapplies it. If the short circuit condition remains, the power is again cut for 5 seconds, and again slowly reapplied. In a preferred embodiment, this cycle will repeat for as long as the short circuit condition exists. However, it is to be understood that switch 90 may also remain open until manually reset.

The snubber filter defined by resistor 80, capacitor 82 and varistor 84, along with the low pass filter defined by filter coil 86 and capacitor 88, prevent the triac 76 from being inadvertently opened during power failures and brownouts or when the power control 10 is subjected to the presence of nearby electrical noise. The power control 10 may also include software and/or additional circuit mechanisms that protect the triac 76 from voltage fluctuations and spikes.

Microprocessor 50 controls the power supply 71 so as to apply power to the heating devices 30 in a gradual manner generally known as a "soft start". The soft start application of voltage to the heating devices 30 prevents voltage surges from damaging the heating devices 30 and especially the bulbs of a heating lamp.

A preferred embodiment of the present invention comprises a distributed power control system for controlling a plurality of heating devices 30 used to create a microenvironment 44 within a larger environment as described above in conjunction with FIG. 4. See FIG. 5. Each of the microenvironments 44 are heated by one or more heating devices 30. The heating devices 30 pictured in FIG. 5 are heating lamps, though it is to be understood that other heating devices such as heating mats, quartz radiant heaters, or standard resistant wire electric heaters may be used as well. The heating devices 30 are connected to one or more sources of electrical power 100 by conductors 101 that are coupled to the heating devices 30 in a hard connection or a removable plug as shown schematically at 103. The provision of electric power from the power source 100 to which each of the heating devices 30 are connected is controlled by a number of slave switches 102. Each of the slave switches 102 is in turn electrically coupled to a master control 104 by a communications means 108, which may be an electrically conductive cable, a wireless transmitter, or a communications cable such as a telephone cable or fiber optic cable. The master control 104 has an external temperature sensor 106 attached thereto for sensing the temperature within the farrowing room 40 in the same manner as temperature sensor 22 described hereinabove. The temperature sensor 106 of the master control 104 is therefore constructed and arranged to sense the ambient temperature within the farrowing room 40 and to provide this data to a microprocessor (not shown) that directs the plurality of slave switches 102 to allow a predetermined quantity of electrical power to flow from the power source 100 to the heating device 30.

The distributed power control 10 described above is illustrated schematically in FIG. 9. The master control 104 is connected to the slave switch 102 by a communications means that in this embodiment is a serial communication cable 108. The temperature sensor 106 is operatively coupled to the microprocessor 150 of the master control 104. The microprocessor 150 also has a numeric display 152, a RAM and/or ROM memory device 154, an input device 156 such as a keypad or the like, an internal temperature sensor 158, and a power supply 160 that provides the necessary power for controlling the microprocessor 150 and its attached devices.

Figure 9:
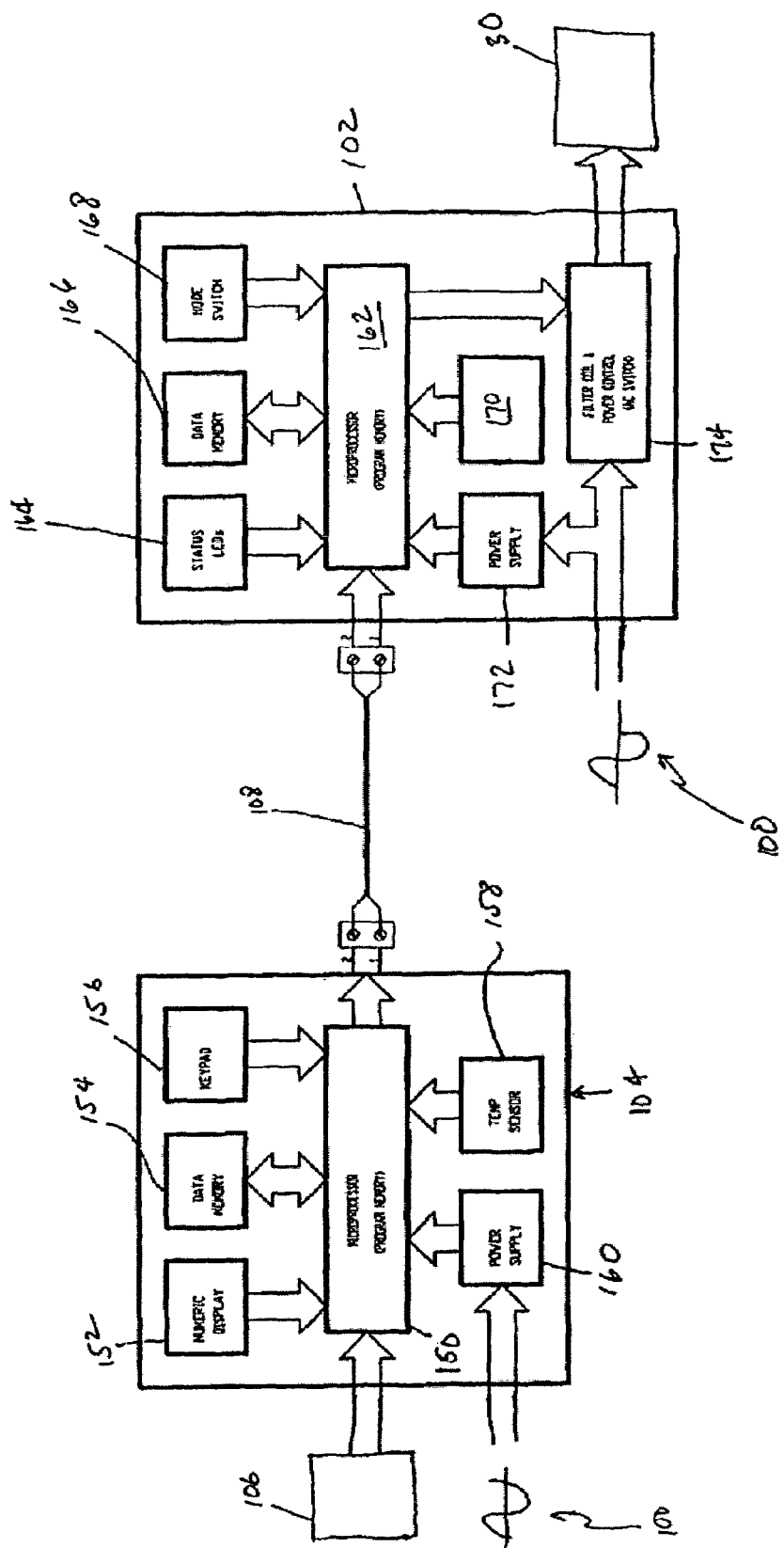

FIG. 9 also illustrates schematically the slave switch 102. The slave switch 102 is typically distant to the master control 104 and therefore includes its own microprocessor 162. The microprocessor 162 of the slave switch 102 is coupled to the master control 104 by communications means 108. The microprocessor 162 has coupled thereto an output device 164 such as a status LED or a numeric display, a RAM and/or ROM memory device 166, an input device 168 that allows for local control of the slave switch 102, a fault control circuit 170, and a power supply 172. The power supply 172 receives power from a power source 100 such as a breaker panel and provides the power to operate the microprocessor 162 and its attendant devices and also provides power to a power control switch 174. The power control switch 174 is also coupled to and controlled by the microprocessor 162 and regulates power that is applied to a heating device 30. The power control switch 174 also includes an RCL filter for preventing electromagnetic interference. The inductor of the RCL filter of the power control switch 174 is magnetically coupled to the fault control circuit 170 such that where the magnetic field present in the inductor of the RCL filter exceeds a predetermined set point, the fault control circuit 170 will cut power to the heating device 30 as the presence of large magnetic fields in the inductor of the RCL filter is indicative of a fault condition in the power control 10. Note that magnetically coupling the inductor of the RCL filter to the fault control circuit 170 requires only a single inductor in the power control switch 174.

The distributed embodiment of the power control 10 illustrated in FIGS. 5-7 operates in the same manner as does the embodiments described in conjunction with FIGS. 2-4 above. However, the manner in which the slave switches 102 are arranged with respect to the master control 104 may vary from application to application.

A preferred embodiment of the distributed power control 10 involves providing a single power source 100 for a plurality of microenvironments. The slave switch 102 is coupled between the single power source 100 and the heating devices 30 used to create the plurality of microenvironments 44. Note that each microenvironment 44 may require more than one heating device. Accordingly, a single slave switch 102 may be used to control multiple heating devices 30 in multiple microenvironments 44. Because of the distributed nature of the embodiment of the power control 10 illustrated in FIGS. 5-7, a single master control 104 may control the microenvironments 44 for a large number of farrowing sows at a given time. Note that where a single master control 104 is used, it may be necessary to ensure that farrowing sows are brought into estrus and inseminated on an identical schedule so as to ensure that the resulting piglets are all of substantially the same age.

Another embodiment of the distributed power control 10 involves providing a single slave switch 102 for each microenvironment and coupling the slave switches 102 to the master control 104 using communication means 108. In this embodiment, the slave switches 102 many be operated identically by the master control 104 or may be operated independent of one another such that each microenvironment 44 in a farrowing room 40 might have a different temperature at a given time. In these cases, it is preferable to provide a master control 104 that comprises a programmable logic controller (PLC) or, more preferably, a remotely located personal computer or other computing device having a processing power sufficient to track independently each of the farrowing rooms 40, farrowing crates 42, and microenvironments 44 associated therewith. With this embodiment of the distributed power control 10, for example, a sow two weeks out of cycle with the remainder of the impregnated sows may be accommodated without undue effort. By using a distributed system of this type a single computer/master control 104 could be used to control hundreds or even thousands of microenvironments 44 all on different schedules without regard to the development rate of the piglets involved.

In operation, the master control 104 utilizes the temperature sensor 106 to sense the ambient temperature within the farrowing room 40. The master control 104 then checks to see where the sensed temperature falls with respect to a specified control band as described hereinabove. A microprocessor within master control 104 then selects an appropriate power setting that is transmitted from the master control 104 to the slave switches 102. The slave switches 102 then adjust the power flowing from the source 100 to the heating devices 30. The slave switches 102 comprise a power supply that receives power from power source 100 and a switching mechanism that may include a triac as described hereinabove in conjunction with FIG. 3. Another embodiment of the switching mechanism may comprise a pair of thyristors and an associated circuit that controls them. The switching mechanism is coupled to the master control 104 via communications means 108 and receives instructions therefore regarding the amount of power that is to be applied to the heating devices 30. In addition, it is desirable to provide the slave switches 102 with the fault detection and filter mechanisms described in conjunction with FIG. 3 above to ensure the safe and reliable operation of the distributed power control 10.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of providing a heated microenvironment within a larger environment, comprising steps of:
    providing a heating device constructed and arranged to create a heated microenvironment within a larger environment;
    selecting a low temperature limit at and below which the heating device will be caused to operate at substantially 100% of its rated power;
    selecting a high temperature limit at which the heating device will be caused to operate at substantially 0% of its rated power;
    measuring a temperature of the larger environment outside of the microenvironment;
    applying power to the heating device where the temperature of the larger environment is below the high temperature limit such that the heating device creates the heated microenvironment, the power applied to the heating device being varied with the temperature of the larger environment so as to maintain a continuous heat output from the heating device; and
    automatically adjusting at least one of the low temperature limit and the high temperature limit as a function of time.

2. The method of claim 1 wherein the power applied to the heating device varies linearly between 0%-100% of the heating device's rated power over the range defined by the high and low temperature limits.

3. The method of claim 1 wherein the power applied to the heating device is varied between 0%-100% of the heating device's rated power over the range defined by the high and low temperature limits such that the output of the heating device varies linearly over the range defined by the upper and lower temperature limits.

4. The method of claim 1 wherein the power to the heating device is cut off when the temperature of the larger environment is above the high temperature limit.

5. The method of claim 1 wherein the power to the heating device is set to 100% of the heating device's rated power when the temperature of the larger environment is below the lower temperature limit.

6. The method of claim 1 wherein the high and low temperature limits are periodically lowered over a predetermined period of time.

7. The method of claim 1 wherein the high and low temperature limits are varied in a linear manner.

8. The method of claim 1 wherein the high and low temperature limits are lowered continuously over a predetermined period of time.

9. The method of claim 1 wherein the high and low temperature limits are varied in a non-linear manner.

* * * * *